United States Patent [19]

Shimizu

[11] Patent Number: 5,663,811
[45] Date of Patent: Sep. 2, 1997

[54] FACSIMILE DEVICE HAVING AUTOMATIC DETECTION OF REGULAR AND MANUAL SCANNING MODES

[75] Inventor: Nobukazu Shimizu, Hino, Japan

[73] Assignees: Kabushiki Kaisha Toshiba, Kawasaki; Kabushiki Kaisha Tec, Shizuoka, both of Japan

[21] Appl. No.: 635,212

[22] Filed: Apr. 17, 1996

Related U.S. Application Data

[63] Continuation of Ser. No. 376,093, Jan. 20, 1995, abandoned, which is a continuation of Ser. No. 121,249, Sep. 15, 1993, abandoned.

[30] Foreign Application Priority Data

Sep. 16, 1992 [JP] Japan .................................. 4-246898

[51] Int. Cl.$^6$ .................................................. H04N 1/00
[52] U.S. Cl. .......................... 358/473; 358/442; 382/313
[58] Field of Search ................................. 358/471, 473, 358/474, 400, 402–406, 442, 468; 379/100; 382/313, 315; 395/155, 157, 159; H04N 1/00, 1/04

[56] References Cited

U.S. PATENT DOCUMENTS

| | | |
|---|---|---|
| 4,962,526 | 10/1990 | Kotani et al. ........................... 358/473 |
| 5,140,442 | 8/1992 | Shigemura et al. ..................... 358/473 |
| 5,172,243 | 12/1992 | Hayashi et al. ......................... 358/473 |
| 5,278,673 | 1/1994 | Scapa et al. ............................. 358/473 |
| 5,414,533 | 5/1995 | Sawase et al. .......................... 358/473 |
| 5,418,630 | 5/1995 | Mori et al. ............................... 358/473 |
| 5,550,938 | 8/1996 | Hayakawa et al. ..................... 358/473 |

FOREIGN PATENT DOCUMENTS

| | | |
|---|---|---|
| 60-106272 | 6/1985 | Japan . |
| 1-12389 | 1/1989 | Japan . |

*Primary Examiner*—Kim Vu
*Attorney, Agent, or Firm*—Finnegan, Henderson, Farabow, Garrett & Dunner, L.L.P.

[57] ABSTRACT

When a reading mode selection switch is depressed in a state where a document detection switch detected that a document is set in a facsimile device, a central processing unit sets the document reading mode in the regular scanner mode in which the document is read by being automatically conveyed within the facsimile device. When the reading mode selection switch is depressed in a state where the document detection switch detected that the document is not set in the facsimile device, the central processing unit sets the document reading mode in the hand scanner mode in which a document is read by a hand scanner moved by an operator manually on the document.

11 Claims, 8 Drawing Sheets

5,663,811

FACSIMILE DEVICE HAVING AUTOMATIC DETECTION OF REGULAR AND MANUAL SCANNING MODES

This application is a continuation of application Ser. No. 08/376,093, filed Jan. 20, 1995, now abandoned, which is a continuation of application Ser. No. 08/121,249, filed Sep. 15, 1993, abandoned.

BACKGROUND OF THE INVENTION

1. Field of the Invention

The present invention relates to a facsimile device capable of selecting its document reading mode between the hand scanner mode for reading an image on a document by manually scanning the document and the regular scanner mode for reading the image by automatically conveying a document set in the document insertion section of the facsimile device, and more particularly to a facsimile device which detects whether a document is set in the document insertion section of the facsimile device and automatically selects the document reading mode based on the detection when a reading mode selection switch is operated.

2. Description of the Related Art

There has been proposed a facsimile device of a type in which a hand scanner is detachably mounted on the facsimile device in addition to a regular scanner provided within the facsimile device. The facsimile device of this type is capable of reading an image on a desired portion of a document by manually scanning the document with the hand scanner in addition to regular reading in which a document set on the body of the facsimile device is read by the regular scanner by automatically conveying the document.

The hand scanner is electrically connected through a curled cord or the like to the body of the facsimile device. In reading a documents the hand scanner is placed on the document and scans it manually. With the use of the hand scanner, images on books or large documents which cannot be inserted into the regular scanner can be read directly. Therefore, range of utilization of the facsimile device is widened greatly.

In the facsimile device provided with a hand scanner in addition to the regular scanner, the facsimile device must be set in the regular mode when the regular scanner is used while it must be set in the hand scanner mode when the hand scanner is used.

With such structure, there arises a problem that when a document is desired to be read by the hand scanner while the facsimile device is in the regular scanner mode, the document cannot be read by the hand scanner, and vice versa.

SUMMARY OF THE INVENTION

Accordingly, an object of the present invention is to provide a facsimile device capable of appropriately and easily switching its reading mode between the regular scanner mode and the hand scanner mode.

In order to achieve the object, the present invention provides a facsimile device comprising hand scanner means including a scanner unit for reading an image on a document by scanning the document manually; automatic scanner means for automatically conveying the document inserted in a document insertion section of the facsimile device to read an image on a document; a single mode selection switch provided on an operation panel section of the facsimile device; document detection means for detecting whether the document is set in the document insertion section; control means for selecting a regular scanner mode in which the automatic scanner means reads the image on the document when the mode selection switch is depressed in a state where the document detection means has detected that a document is set in the document insertion section, and for selecting a hand scanner mode in which the hand scanner means reads the image on the document when the mode selection switch is depressed in a state where the document detection means has detected that a document is not set in the document insertion section.

The document detection means detects whether a document is set in the document insertion section of the facsimile device. The control means selects the regular scanner mode when the mode selection switch is depressed in a state in which the document detection means has detected that a document is set in the document insertion section and selects the hand scanner mode when the mode selection switch is depressed in a state in which the document detection means has detected that a document is not set in the document insertion section.

According to the present invention, the control means selects the regular scanner mode when the mode selection switch is depressed in a state in which the document detection means has detected a document is set in the document insertion section of the facsimile device, and selects the hand scanner mode When the mode selection switch is depressed in a state in which the document detection means has detected a document is not set in the document insertion section. Thus, switching between the regular scanner mode and the hand scanner mode is made automatically and appropriately, thereby avoiding wrong setting of the document reading mode, the regular scanner mode or the hand scanner mode, so as to improve operability of the facsimile device.

DESCRIPTION OF THE PREFERRED EMBODIMENTS

An embodiment of the inventive facsimile device will be described below with respect to the accompanying drawings.

Figure 1:
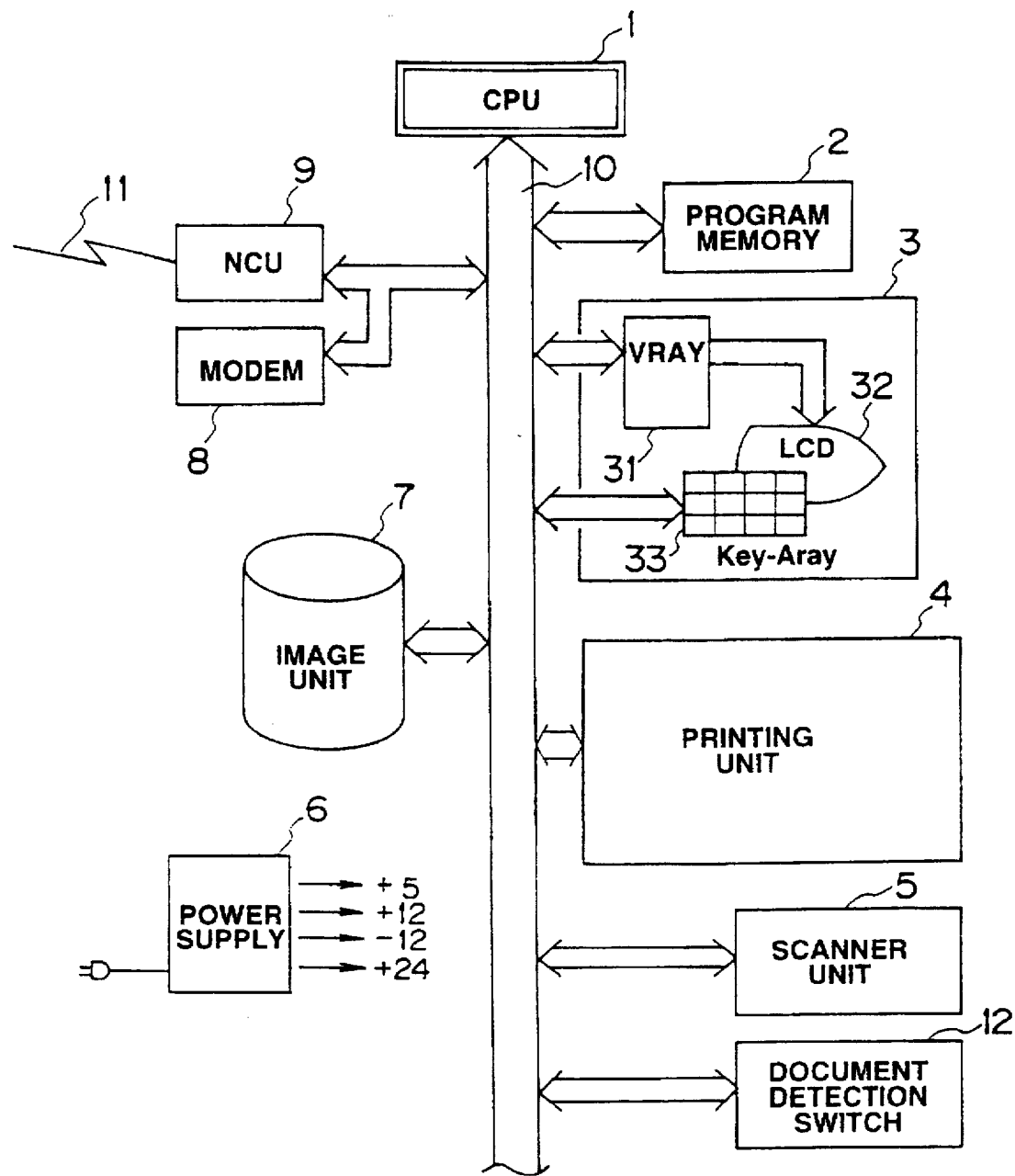
FIG. 1 is a block diagram of an embodiment of the facsimile device according to the present invention.

Referring to FIG. 1, the facsimile device comprises a central processing unit (CPU) 1 which controls the respective elements of the device, a program memory 2 which stores programs for the CPU 1 to control the respective elements, processed data, etc., an operation panel 3 which gives commands to start various operations such as display of image data on a received document and a print start command, a printing unit 4 which prints image data on recording paper in accordance with a print start command, a scanner unit 5 which scans and reads a received document, etc, a power supply 6 which provides power to the elements of the device, an image memory 7 which stores image data received from other facsimile devices or obtained by reading through scan, a modem 8 which modulates and demodulates image data involved 20 in facsimile communication, a network control unit (NCU) 9 which controls the connection between the facsimile device and the network, a document detection switch 12 which detects whether a document is set on a document insertion unit 100a to be described later and a system bus 10 which transfers data between the CPU 1 and the respective elements. The NCU 9 is connected to a communication line 11.

The operation panel 3 comprises a memory (video RAM) 31 which stores image data to be displayed, a liquid crystal display (LCD) 32 which displays image data stored in the video RAM 31, and a transparent touch panel key array 33 provided on a surface of the LCD 32.

In the basic operation of the facsimile device, image data received, for example, on the communication line 11 through the NCU 9 is stored temporarily in the image memory 7 through the data bus 10 under control of the CPU 1. Similarly, the image data obtained by the scanning of the scanner unit 5 is stored temporarily through the data bus 10 in the image memory 7.

The image data stored in the image memory 7 can be read out in unit of a file or a page in accordance with predetermined operations on the touch panel 33 of the operation panel 3, and displayed on the LCD 32 or output as a hard copy using the printing unit 4.

Figure 2:
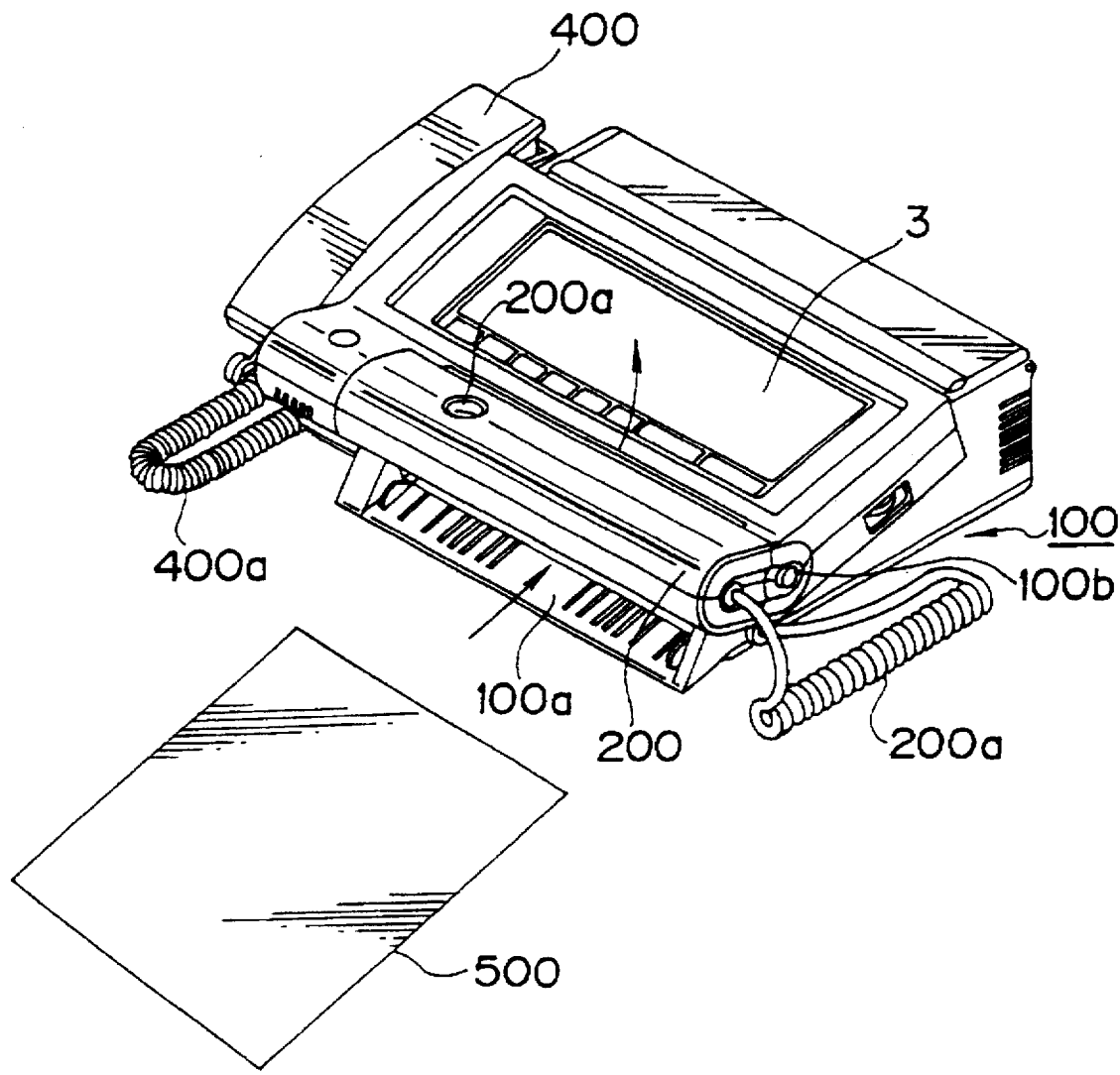
FIG. 2 is a perspective view of the facsimile device of FIG. 1.

FIG. 2 shows the outer structure of the facsimile device of this embodiment in which a hand scanner 200 is detachably mounted to a device body 100. The hand scanner 200 is connected through a curled cord 200a to the device body 100. A handset 400 is connected through a curled cord 400a to the facsimile device for communicating purposes. FIG. 2 shows the hand scanner 200 mounted on the device body 100.

When a document 500 is read in the regular scanner mode, it is set in the document insertion unit 100a of the device body 100 and a start button to be described later too on the operation panel 3 is depressed. The direction of conveyance of the document in the regular scanner mode is shown by the arrow in FIG. 2.

Figure 3:
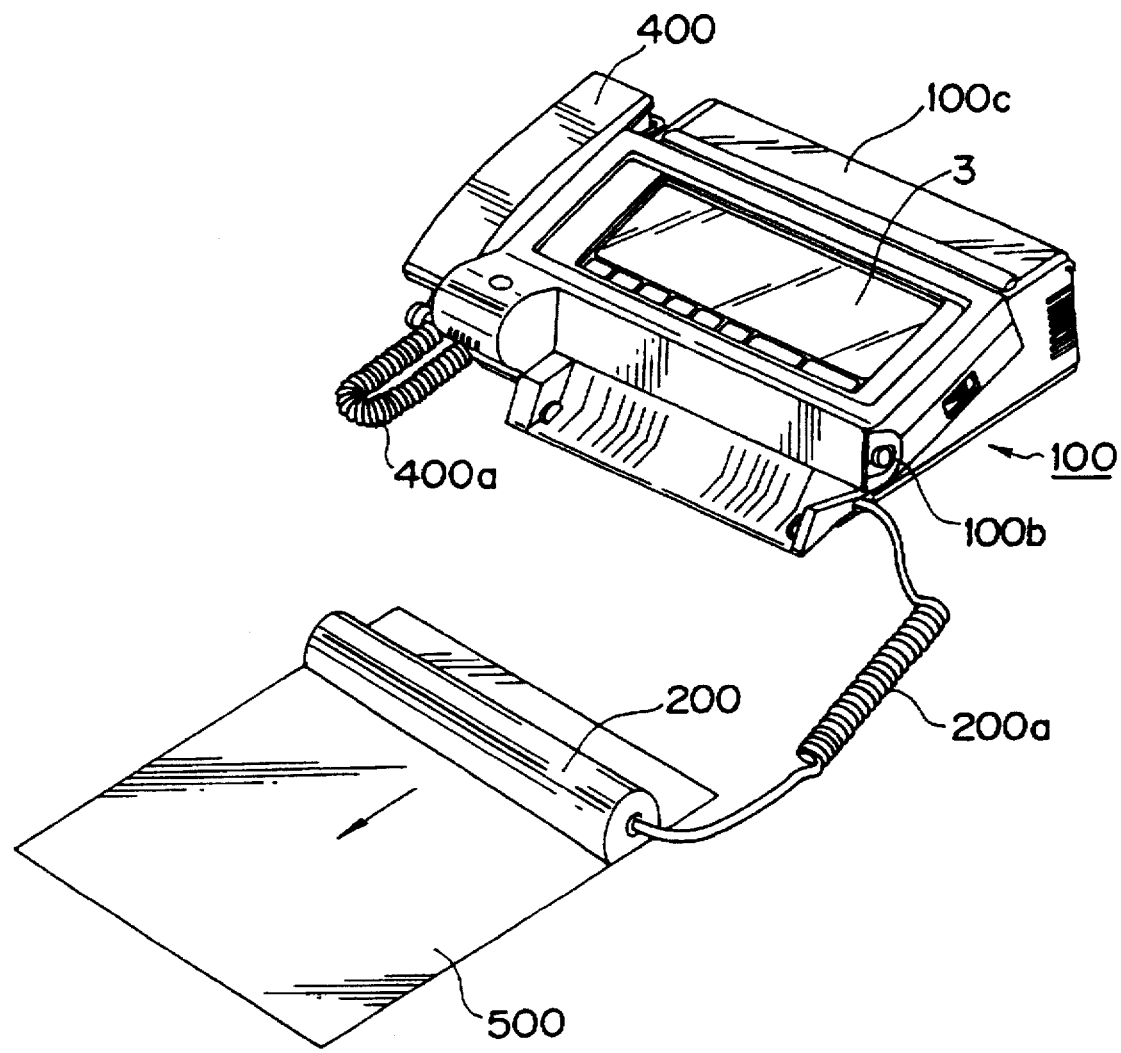
FIG. 3 is a perspective view of the facsimile device and the hand scanner dismounted from the body of the facsimile device of FIG. 2.

FIG. 3 shows a state in which the hand scanner 200 removed from the device body 100 reads a document 500 in the hand scanner mode. In this case, by the depression of a hand scanner removal button 100b, the hand scanner 200 is removed from the device body 100, as shown in FIG. 3; placed on the document 500; and scanned manually in the direction of the arrow to read an image on the document 500. This scan is made while the scanner button 201 of FIG. 2 is kept depressed. A release in the depression of the scanner button 201 ends reading by the scanner 200.

Figure 4:
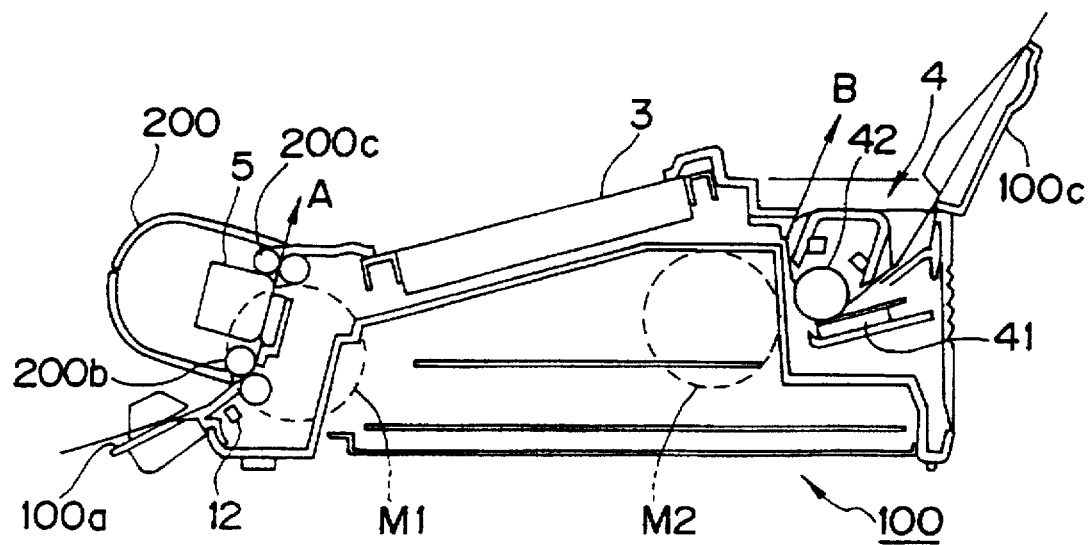
FIG. 4 is a sectional view illustrating the internal structure of the facsimile device of FIG. 2.

FIG. 4 shows the internal structure of the facsimile device. In FIG. 4, a document set in the document insertion unit 100a is detected by the document detection switch 12 to thereby drive a transmission motor M1. This causes the set document to be conveyed through a drive roller 200b and read by the scanner unit 5 within the hand scanner 200. The read document is discharped to the outside through a pinch roller 200c as shown by the arrow A.

To output data on the document stored in the image memory 7 of FIG. 1 as a hard copy, a cover 100c of the device body 100 is opened and a sheet of recording paper is inserted into the printing unit 4. In this embodiment, the printing unit 4 is arranged to cause a thermal head 41 to print. The sheet of recording paper inserted into the printing unit 4 is conveyed by a platen roller 42 which is driven by a reception motor M2; printed by the thermal head 41; and carried to the outside, as shown by the arrow B.

Figure 5:
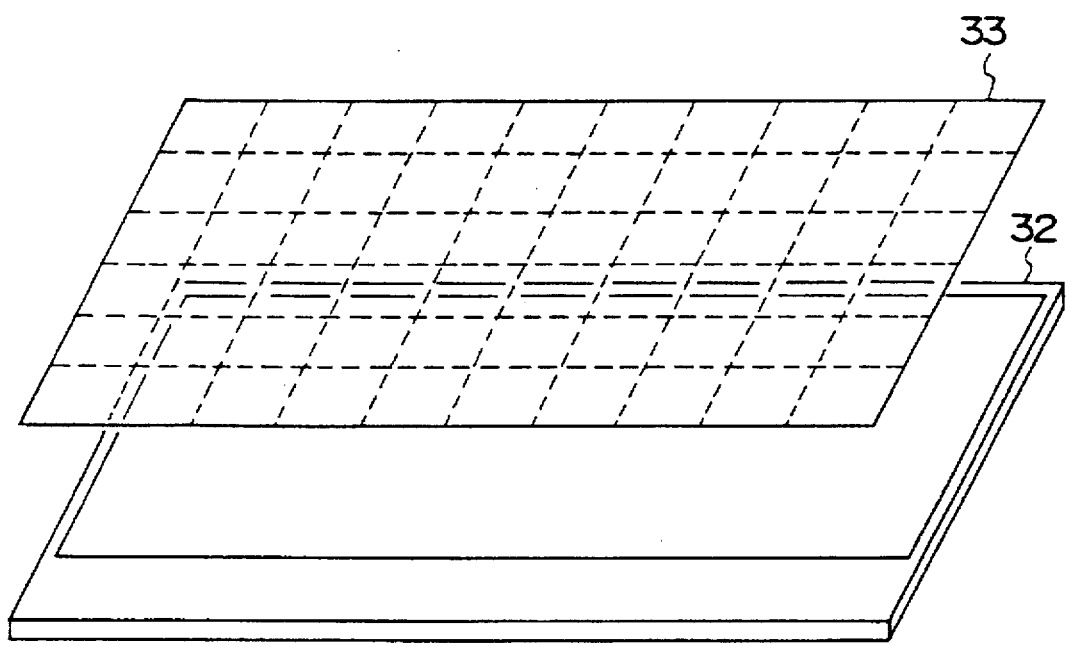
FIG. 5 is a schematic view illustrating a structure of an operation panel of the facsimile device of FIG. 1.

FIG. 5 is a schematic view of a structure of the operation panel 3 of FIG. 1, which includes a transparent touch panel having substantially the same area as a liquid crystal display (LCD) 32 and placed on the LCD.

The touch panel 33 has a plurality of matrix areas (defined by the broken lines in FIG. 5) corresponding to menus such as characters and pictures drawn on the LCD 32. Arrangement is such that when one of the matrix areas is depressed, a command output corresponding to a character or picture drawn on that area is produced. The operator uses the touch panel 33 while considering the characters and pictures displayed on the LCD 32 as corresponding switches. Thus, by depressing the appropriate matrix areas, various corresponding operations are performed.

A mode selection switch is provided as one of the operations executable on the operation panel 3.

Figure 6:
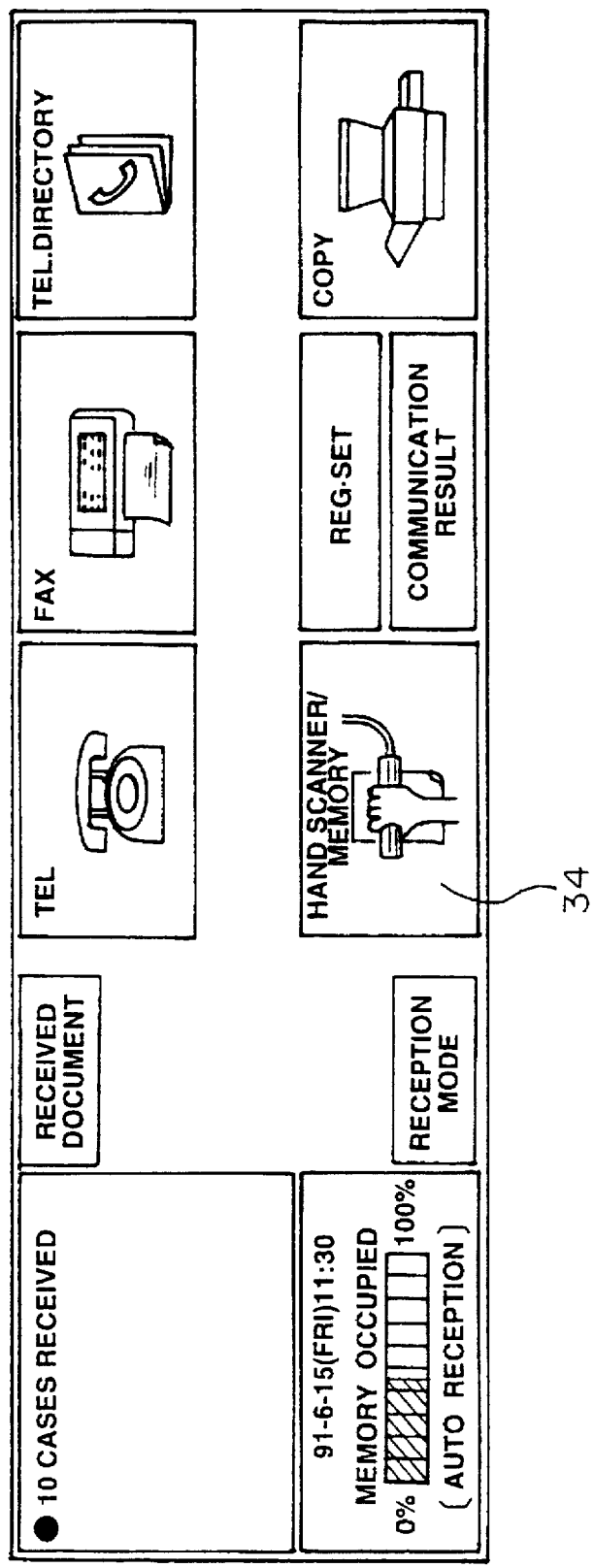
FIG. 6 illustrates one of operation display screens displayable on the operation panel.

FIG. 6 shows one of operation display screens displayable on the panel 3. An area 34 described as a "hand scanner/memory" on the operation display screen constitutes a reading mode selection switch. When the operation display screen of FIG. 6 has been displayed on the operation panel 3 in the embodiment, depression of the "hand scanner/memory" area 34 switches selectively between the regular scanner mode and the hand scanner mode.

The selection between the regular scanner mode and the hand scanner mode is made depending on whether a document is set in the document insertion unit 100a of FIG. 2.

More particularly, depression of the hand scanner/memory area 34 when the operation display screen of FIG. 6 has been displayed on the panel 3 causes a signal indicative of this fact to be sent through the bus 10 of FIG. 1 to the CPU 1. The CPU 1 checks the state of the document detection switch 12 which is on when a document is set in the document insertion unit 100a. If the switch 12 is off, the CPU 1 automatically sets the hand scanner mode while if the switch 12 is on, the CPU 1 automatically sets the regular scanner mode.

Figure 7:
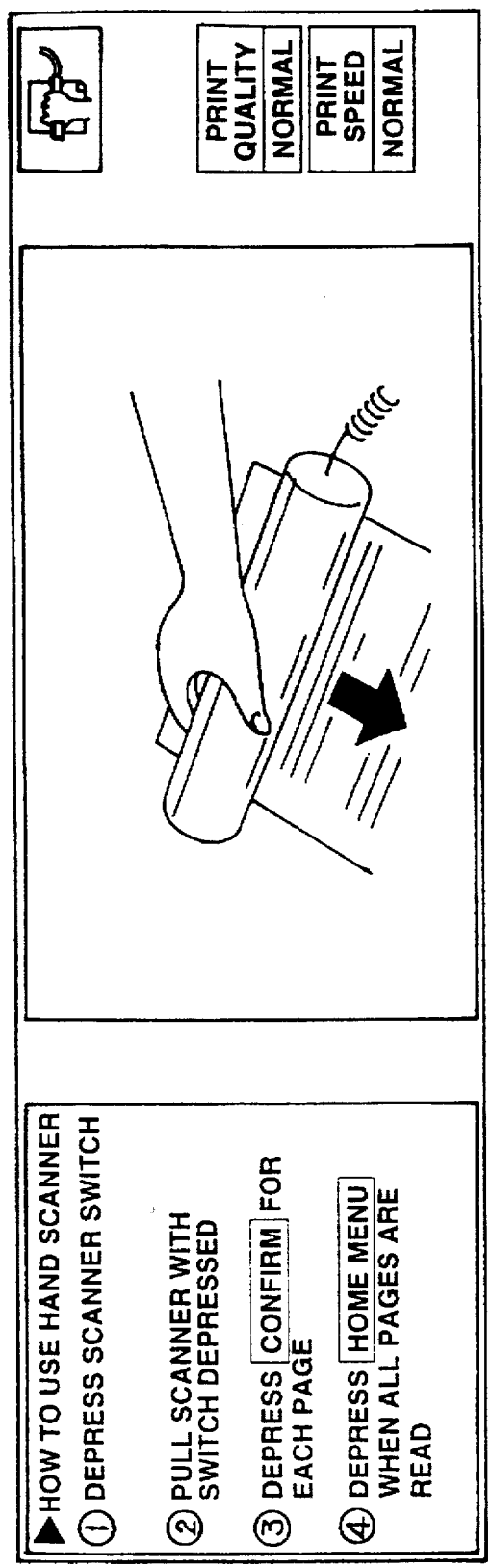
FIG. 7 illustrates an example of the operation display screen when the hand scanner mode is set in the display state of FIG. 6.

FIG. 7 shows an operation display screen which will be next displayed on the operation panel 3 if the document detection switch 12 is off when the "hand scanner/memory" area 34 is depressed in a state where the operation display screen of FIG. 6 is displayed on the operation panel 3. In this case, since the hand scanner mode is automatically set, the following guidance for explaining how to use the hand scanner is displayed in the left-hand portion of the operation panel 3:

1) Switch on the hand scanner;
2) Pull the hand scanner toward your side while depressing its switch;
3) Depress a confirmation button for each page; and
4) In order to end the operation, depress the home menu button after all the pages are read. How to use the hand scanner is illustrated in the central portion of the operation panel. A picture which indicates setting of the hand scanner mode, a printed-picture quality, and a printing density is displayed in the right-hand portion of the panel.

Figure 8:
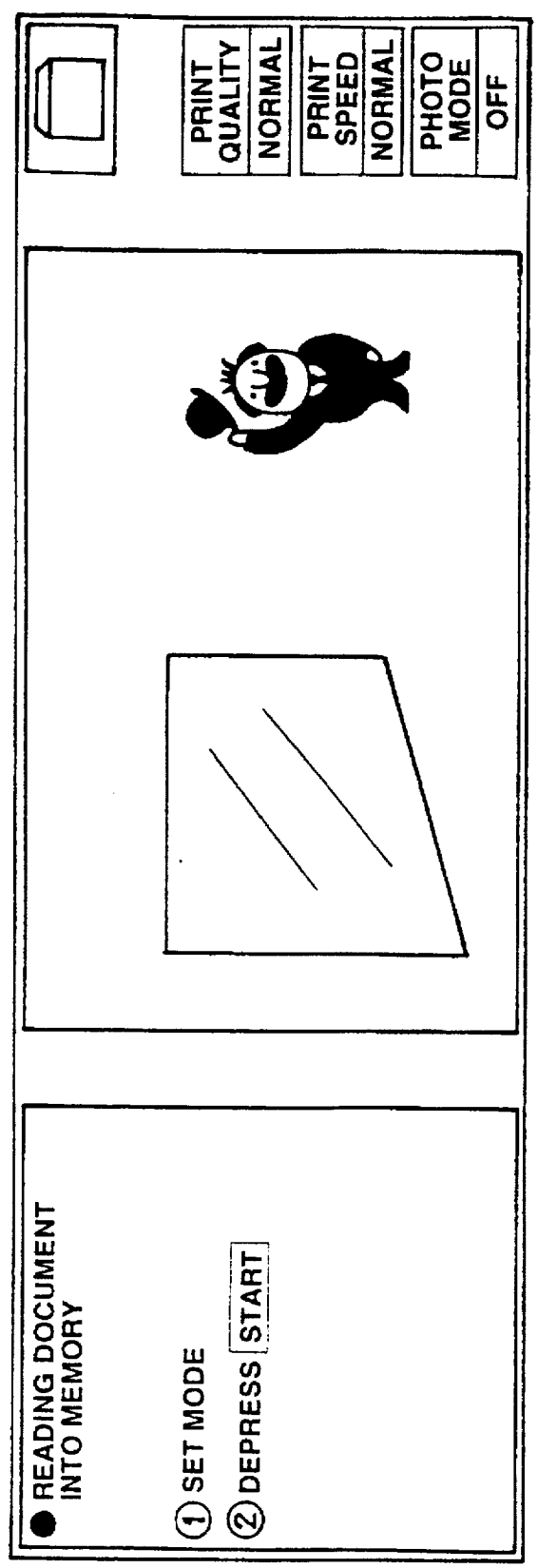
FIG. 8 illustrates an example of the operation display screen when the regular scanner mode is set in the display state of FIG. 6.

FIG. 8 shows an operation display screen which will be next displayed on the operation panel 3 if the document detection switch 12 is on when the "hand scanner/memory" area 34 is depressed in a state where the operation display screen of FIG. 6 is displayed on the operation panel 3. In this case, since the regular scanner mode is automatically set, the following guidance for explaining an operation in the regular scanner mode is displayed in the left-hand portion of the operation panel 3:

1) Set a mode; and
2) Depress the start button.

The employment of the regular scanner mode is illustrated in the central portion of the operation panel. A picture which indicates the setting of the regular scanner mode, a printed-picture quality, a printing density and the presence/absence of a photography mode are displayed in the right-hand portion of the panel.

It is to be noted that the operation display screens on the operation panel 3 of FIGS. 6–8 are examples and there may be other examples of the screens.

Figure 9:
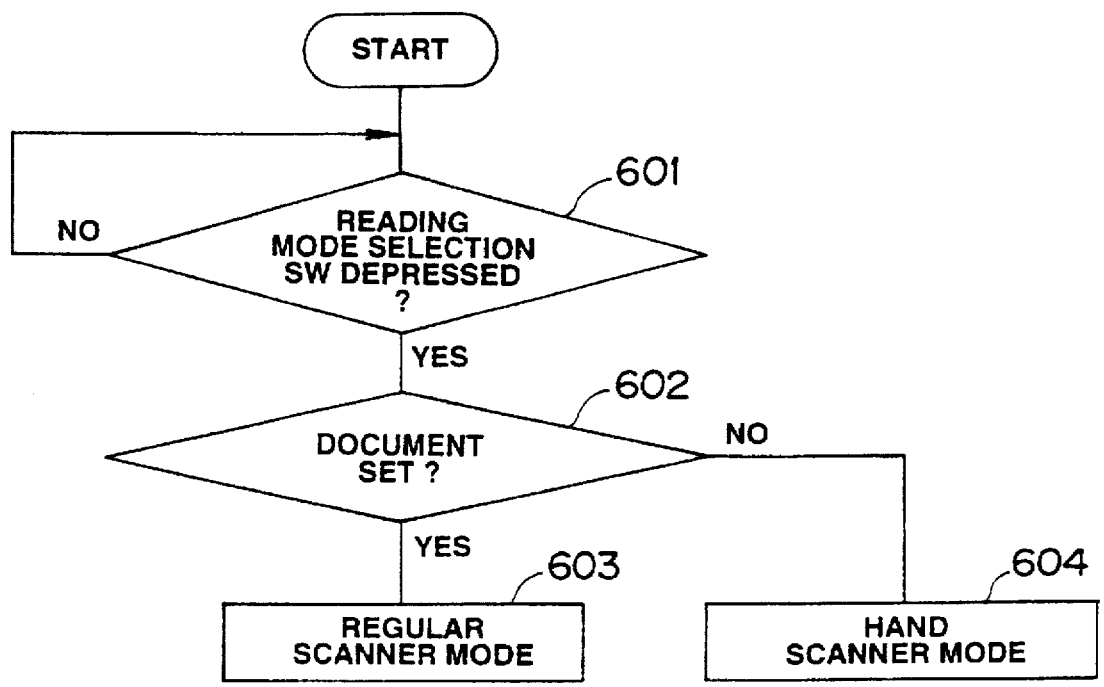
FIG. 9 is a flowchart illustrating a reading mode selecting operation in the embodiment of FIG. 1.

FIG. 9 is a flowchart illustrating the control carried out by the CPU 1 when the "hand scanner/memory" area 34 on the operation display screen of FIG. 6 or the reading mode selection switch is operated.

First, it is checked whether the reading mode selection switch has been depressed (step 601). If so, it is determined whether a document is set on the document insertion unit 100a or whether the document detection switch 12 of FIG. 1 is on (step 602). If the answer is affirmative at step 602, the regular scanner mode is set automatically (step 603). If the answer is negative at step 602, the hand scanner mode is set automatically (step 604).

According to such arrangement, the user can select the document reading mode, i.e., the regular scanner mode or the hand scanner mode without being conscious of such selection at all.

That is, when a document is desired to be read in the regular scanner mode, only required operations are to set the document in the document insertion unit 100a and to depress the reading mode selection switch. When a document is desired to be read in the hand scanner mode, only required operation is to depress the reading mode selection switch.

Such structure serves to remove incorrect selection of the regular or hand scanner mode, and operability is greatly improved.

What is claimed is:

1. A facsimile device comprising:

hand scanner means including a scanner unit for reading an image on a document by scanning the document manually, the hand scanner means being detachably mounted on a body of the facsimile device;

automatic scanner means for automatically conveying the document inserted in a document insertion section of the facsimile device to read an image on a document;

a single reading mode selection switch provided on an operation panel the facsimile device;

document detection means for detecting whether the document is set in the document insertion section;

display means for displaying information provided on the body of the facsimile device;

reading mode selecting means for selecting a regular scanner mode in which the automatic scanner means reads the image on the document and for causing the display means to display first operation procedures indicating operation procedures of the facsimile device in the regular scanner mode when the mode selection switch is depressed in a state where the document detection means has detected that a document is set in the document insertion section, and for selecting a hand scanner mode in which the hand scanner means reads the image on the document and causing the display means to display second operation procedures indicating operation procedures of the facsimile device in the hand scanner mode when the mode selection switch is depressed in a state where the document detection means has detected that a document is not set in the document insertion section; and reading control means for causing the automatic scanner means to read the image on the document in accordance with the first operation procedures when the regular scanner mode is selected by the reading mode selection switch, and for causing the hand scanner means to perform reading operations of the image on the document in accordance with the second operation procedures when the hand scanner mode is selected by the reading mode selection switch and after the hand scanner means is dismounted from the body of the facsimile device.

2. A facsimile device according to claim 1, wherein the hand scanner means includes a scanner unit and is detachably mounted in a body of the facsimile device in such a manner that the document insertion section is provided between the hand scanner means and the body of the facsimile device, and the automatic scanner means reads the document using the scanner unit provided in the hand scanner means.

3. A facsimile device according to claim 2, wherein the document detection means is provided in the body of the facsimile device at a position facing the document insertion section.

4. A facsimile device according to claim 1, wherein the display means comprises a liquid crystal display, and the operation panel comprises a transparent touch panel superposed on a display surface of the liquid crystal display.

5. A facsimile device comprising:

hand scanner means including a scanner unit for reading an image on a document by manually scanning the document;

a body of the facsimile device on which the hand scanner means is detachably mounted;

document insertion section provided between the hand scanner means mounted on the body and the body of the facsimile device;

document detection means for detecting a document set in the document insertion section;

document conveyance means for conveying the document set in the document insertion section through the document insertion section in a state where the hand scanner means is mounted;

a single reading mode selection switch means provided on an operation panel of the facsimile device;

display means provided on the body of the facsimile device;

reading mode selecting means for selecting a regular scanner mode in which the document conveyance means is driven such that the scanner unit in the hand scanner means reads the document conveyed by the document conveyance means and for causing the display means to display first operation procedures indicating operation procedures of the facsimile device in the regular scanner mode when the mode selection switch is depressed in a state where the document detection means has detected that the document is set in the document insertion section, and for selecting a hand scanner mode in which the hand scanner is moved manually on the document so that the scanner unit in the hand scanner means reads the document and causing the display means to display second operation procedures indicating operation procedures of the facsimile device in the hand scanner mode when the mode selection switch is depressed in a state where the; document detection means has detected that the document is not set in the document insertion section; and reading control means for causing the scanner unit to read the image on the document while conveying the document by the document conveyance means in accordance with the first operation procedures when the regular scanner mode is selected by the reading mode selection switch, and for causing the hand scanner means to read the image on the document in accordance with the second operation procedures when the hand scanner mode is selected by the reading mode selection switch and after the hand scanner means is dismounted from the body of the facsimile device.

6. The facsimile device according to claim 5, wherein when the hand scanner mode is selected, the reading mode selecting means causes the display means to display information indicating that the hand scanner mode is selected.

7. The facsimile device according to claim 5, wherein when the regular scanner mode is selected, the reading mode selecting means causes the display means to display third information indicating that the regular scanner mode is selected.

8. A facsimile device comprising:

hand scanner means including a scanner unit for reading an image on a document by scanning the document manually, the hand scanner means being detachably mounted on a body of the facsimile device;

automatic scanner means for automatically conveying the document inserted in a document insertion section of the facsimile device to read an image on a document;

a single reading mode selection switch provided on an operation panel of the facsimile device;

document detection means for detecting whether the document is set in the document insertion section;

a start key for indicating start of document reading;

display means provided on the body of the facsimile device;

reading mode selecting means for selecting a regular scanner mode in which the automatic scanner means reads the image on the document and for causing the display means to display first operation procedures indicating operation procedures of the facsimile device in the regular scanner mode when the mode selection switch is depressed in a state where the document detection means has detected that a document is set in the document insertion section, and for selecting a hand scanner mode in which the hand scanner means reads the image on the document and causing the display means to display second operation procedures indicating operation procedures of the facsimile device in the hand scanner mode when the mode selection switch is depressed in a state where the document detection means has detected that a document is not set in the document insertion section; and reading control means for causing the automatic scanner means to start reading the image on the document when the start key is depressed in accordance with the first operation procedures while the regular scanner mode is selected by the reading mode selection switch, and for causing the hand scanner means to start reading the image on the document when the start key is depressed in accordance with the second operation procedures while the hand scanner mode is selected by the reading mode selection switch and after the hand scanner means is dismounted from the body of the facsimile device.

9. A facsimile device according to claim 8, wherein the hand scanner means includes a scanner unit and is detachably mounted in a body of the facsimile device in such a manner that the document insertion section is provided between the hand scanner means and the body of the facsimile device, and the automatic scanner means reads the document using the scanner unit provided in the hand scanner means.

10. A facsimile device according to claim 9, wherein the document detection means is provided in the body of the facsimile device at a position facing the document insertion section.

11. A facsimile device according to claim 8, wherein the display means includes a liquid crystal display, and the operation panel comprises a transparent touch panel superposed on a display surface of the liquid crystal display and the control means.

* * * * *